US009843593B2

United States Patent
Rostami-Hesarsorkh et al.

(10) Patent No.: US 9,843,593 B2
(45) Date of Patent: *Dec. 12, 2017

(54) DETECTING ENCRYPTED TUNNELING TRAFFIC

(71) Applicant: Palo Alto Networks, Inc., Santa Clara, CA (US)

(72) Inventors: Shadi Rostami-Hesarsorkh, Los Altos, CA (US); Michael Soren Jacobsen, Mountain View, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/476,672

(22) Filed: Sep. 3, 2014

(65) Prior Publication Data

US 2015/0058916 A1    Feb. 26, 2015

Related U.S. Application Data

(63) Continuation of application No. 13/222,874, filed on Aug. 31, 2011, now Pat. No. 8,856,910.

(51) Int. Cl.
*H04L 29/06* (2006.01)
*G06F 21/55* (2013.01)

(52) U.S. Cl.
CPC ........ H04L 63/1408 (2013.01); G06F 21/554 (2013.01); H04L 63/02 (2013.01);
(Continued)

(58) Field of Classification Search
CPC ......... H04L 63/029; H04L 9/00; H04L 29/06; H04L 63/1408; H04L 63/0428;
(Continued)

(56) References Cited

U.S. PATENT DOCUMENTS 6,845,452 B1 * 1/2005 Roddy .................... H04L 63/02
709/223
9,673,987 B2 * 6/2017 Krywaniuk ............. H04L 41/00
(Continued)

OTHER PUBLICATIONS

Scarfone et al., Guidelines on Firewalls and Firewall Policy, 2009.*
(Continued)

*Primary Examiner* — Matthew Smithers
*Assistant Examiner* — Huan V Doan
(74) *Attorney, Agent, or Firm* — Van Pelt, Yi & James LLP

(57) ABSTRACT

Techniques for detecting encrypted tunneling traffic are disclosed. In some embodiments, detecting encrypted tunneling traffic includes monitoring encrypted network communications between a client and a remote server, in which the encrypted network communications are encrypted using a first protocol (e.g., Secure Shell (SSH) protocol or another protocol for encrypted network communications); and determining if the client sends a request to create a tunnel using the first protocol with the remote server. In some embodiments, detecting encrypted tunneling traffic further includes performing an action in response to determining that the client sent a request to create a tunnel using the first protocol with the remote server.

16 Claims, 8 Drawing Sheets

(52) U.S. Cl.
CPC ........ *H04L 63/029* (2013.01); *H04L 63/0272* (2013.01); *H04L 63/0464* (2013.01); *H04L 63/168* (2013.01); *H04L 63/20* (2013.01); *H04L 69/162* (2013.01)

(58) Field of Classification Search
CPC . H04L 63/0464; H04L 63/0478; H04L 63/20; H04L 63/02; H04L 63/0236
See application file for complete search history.

(56) References Cited

U.S. PATENT DOCUMENTS

| | | | |
|---|---|---|---|
| 2003/0131259 A1* | 7/2003 | Barton | H04L 63/0281 726/12 |
| 2004/0015725 A1* | 1/2004 | Boneh | H04L 63/166 713/160 |
| 2006/0031928 A1* | 2/2006 | Conley | H04L 63/0236 726/11 |
| 2008/0082662 A1* | 4/2008 | Dandliker | H04L 63/10 709/225 |
| 2009/0220080 A1* | 9/2009 | Herne | H04L 63/0428 380/255 |
| 2010/0318665 A1* | 12/2010 | Demmer | H04L 41/12 709/227 |
| 2011/0154019 A1* | 6/2011 | Wang | H04L 63/0281 713/153 |
| 2011/0231935 A1* | 9/2011 | Gula | H04L 43/028 726/25 |
| 2013/0247201 A1* | 9/2013 | Alperovitch | H04L 63/14 726/24 |

OTHER PUBLICATIONS

Stonesoft, Inspection of Encrypted HTTPS Traffic, 2009.*
Dusi et al., Detection of Encrypted Tunnels across Network Boundaries, 2008, IEEE, 7 pages.*

* cited by examiner

DETECTING ENCRYPTED TUNNELING TRAFFIC

CROSS REFERENCE TO OTHER APPLICATIONS

This application is a continuation of co-pending U.S. patent application Ser. No. 13/222,874, entitled DETECTING ENCRYPTED TUNNELING TRAFFIC filed Aug. 31, 2011, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
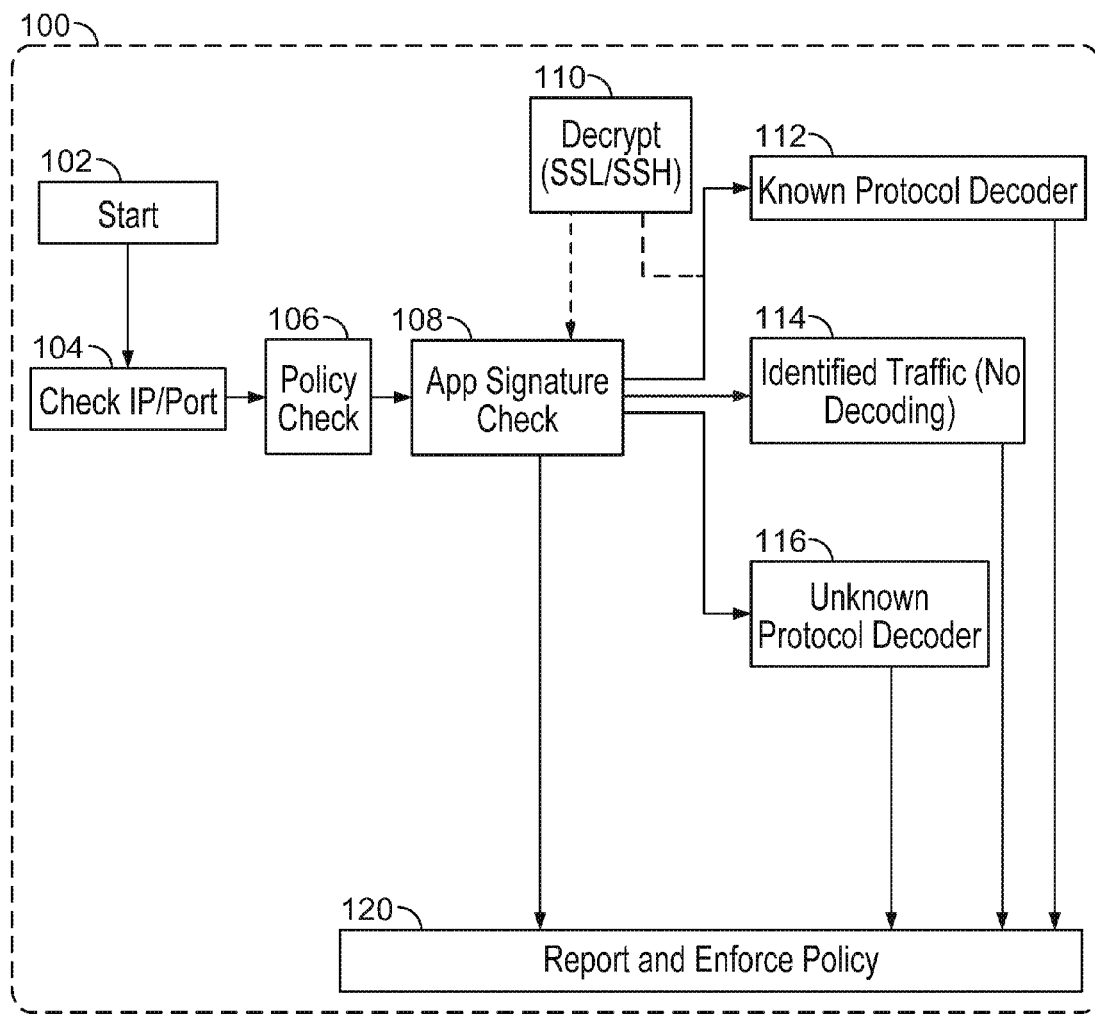
FIG. 1 is a functional diagram for detecting encrypted tunneling traffic in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security appliances or gateway appliances can include security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using Hyper Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, encrypted protocols can be improperly used to evade firewall detection/blocking of unauthorized activities (e.g., downloading of content or using network services that are a violation of the network usage policies of the enterprise, such as peer-to-peer activities, social networking activities, web browsing on certain prohibited web sites, streaming music/video, use of unauthorized protocols or applications, and/or other activities). For example, encrypted protocols can be used by a client device to create a tunnel to connect to a remote server that is outside of the firewall perimeter, and the client can then use the remote server (e.g., as a proxy) to access a network service in order to avoid firewall detection/blocking as the tunneled session traffic between the client and the remote server is encrypted.

Thus, what are needed are techniques for detecting encrypted tunneling traffic. Accordingly, techniques for detecting encrypted tunneling traffic are disclosed. In some embodiments, detecting encrypted tunneling traffic includes monitoring encrypted network communications between a client and a remote server, in which the encrypted network communications are encrypted using a first protocol (e.g., Secure Shell (SSH) protocol or another protocol for encrypted network communications); and determining if the client sends a request to create a tunnel using the first protocol with the remote server. In some embodiments, detecting encrypted tunneling traffic further includes performing an action in response to determining that the client sent a request to create a tunnel using the first protocol with the remote server.

In some embodiments, detecting encrypted tunneling traffic further includes intercepting a request to establish an encrypted session from the client to the remote server; sending a request to establish the encrypted session on behalf of the client to the remote server; sending an encrypted session response to the client on behalf of the remote server using a session key associated with the firewall device; and decrypting encrypted traffic between the client and remote server to monitor for a request from the client to create a tunnel using the first protocol with the remote server. In some embodiments, detecting encrypted tunneling traffic further includes blocking the request to create the tunnel; and sending a response to the client informing the client that tunneling using the first protocol is not supported by the remote server. In some embodiments, detecting encrypted tunneling traffic further includes allowing the request to create the tunnel; monitoring decrypted session traffic between the client and the remote server over the tunnel based on one or more firewall policies; and blocking the session traffic if a violation of a first firewall policy is determined.

In some embodiments, detecting encrypted tunneling traffic further includes allowing the request to create the tunnel; monitoring decrypted session traffic between the client and the remote server over the tunnel based on one or more firewall policies; and generating an alert if a violation of a first firewall policy is determined. In some embodiments, detecting encrypted tunneling traffic further includes allow the request to create the tunnel; monitoring decrypted session traffic between the client and the remote server over the tunnel based on one or more firewall policies; and quarantining the client if a violation of a first firewall policy is determined. In some embodiments, detecting encrypted tunneling traffic further includes allowing the request to create the tunnel; monitoring decrypted session traffic between the client and the remote server over the tunnel based on one or more firewall policies; and sending a message to a cloud security service if a violation of a first firewall policy is determined, in which the message includes identifying information associated with the remote server.

In some embodiments, detecting encrypted tunneling traffic includes detecting and blocking encrypted (e.g., Secure Shell (SSH)) tunneling traffic using various trusted man-in-the-middle decryption techniques (e.g., using a firewall device, such as a firewall appliance or another device executing a firewall). For example, the Secure Shell (SSH) protocol is a protocol that is typically used to support encrypted network protocol for remote administration and remote access of servers (e.g., UNIX servers). Many enterprises/organizations allow SSH traffic to be performed from inside hosts (e.g., clients) to remote servers (e.g., servers available on the Internet) and, thus, do not simply block SSH protocol traffic. However, the SSH protocol can be misused by clients to tunnel encrypted session traffic to evade firewall detection/blocking of unauthorized network activities (e.g., downloading of content or using network services that are a violation of the network usage policies of the enterprise, such as peer-to-peer activities, social networking activities, web browsing on certain prohibited web sites, streaming music/video, use of unauthorized protocols or applications, and/or other activities). As a result, users can use the tunneling feature of SSH to evade firewall policies and, thus, potentially violate their enterprise's network usage/firewall policies/rules. Because SSH is encrypted, deep packet inspection cannot reveal if the traffic of an SSH session is appropriate remote access activities or whether it is some other traffic tunneled over SSH that may be in violation of one or more firewall policies/rules.

Accordingly, various techniques for detecting encrypted tunneling traffic, such as using the SSH protocol, are disclosed (e.g., by facilitating deep packet inspection of the encrypted session traffic). As will be apparent to one skill in the art in view of the various techniques and embodiments described herein, the various techniques described herein for detecting encrypted tunneling traffic can similarly be applied to other encrypted protocols that support tunneling.

FIG. 1 is a functional diagram for detecting encrypted tunneling traffic in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state based firewall. In some embodiments, the state based firewall can monitor traffic flows using APP-ID engine (e.g., App Signature Check & User ID Check 108). For example, the monitored network traffic can include HTTP traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP ID engine using various application signatures for identifying applications based on packet flow analysis). For example, APP-ID engine 108 can be configured to determine what type of traffic the session involves, such as HTTP traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file based, protocol based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, various other functional architectures and flows are provided to implement the policy enforcement using host information profile techniques described herein. For example, some of these functions can be implemented in software executed on a general processor and/or some of these functions can be implemented using hardware acceleration techniques for faster packet processing of network traffic.

Figure 2:
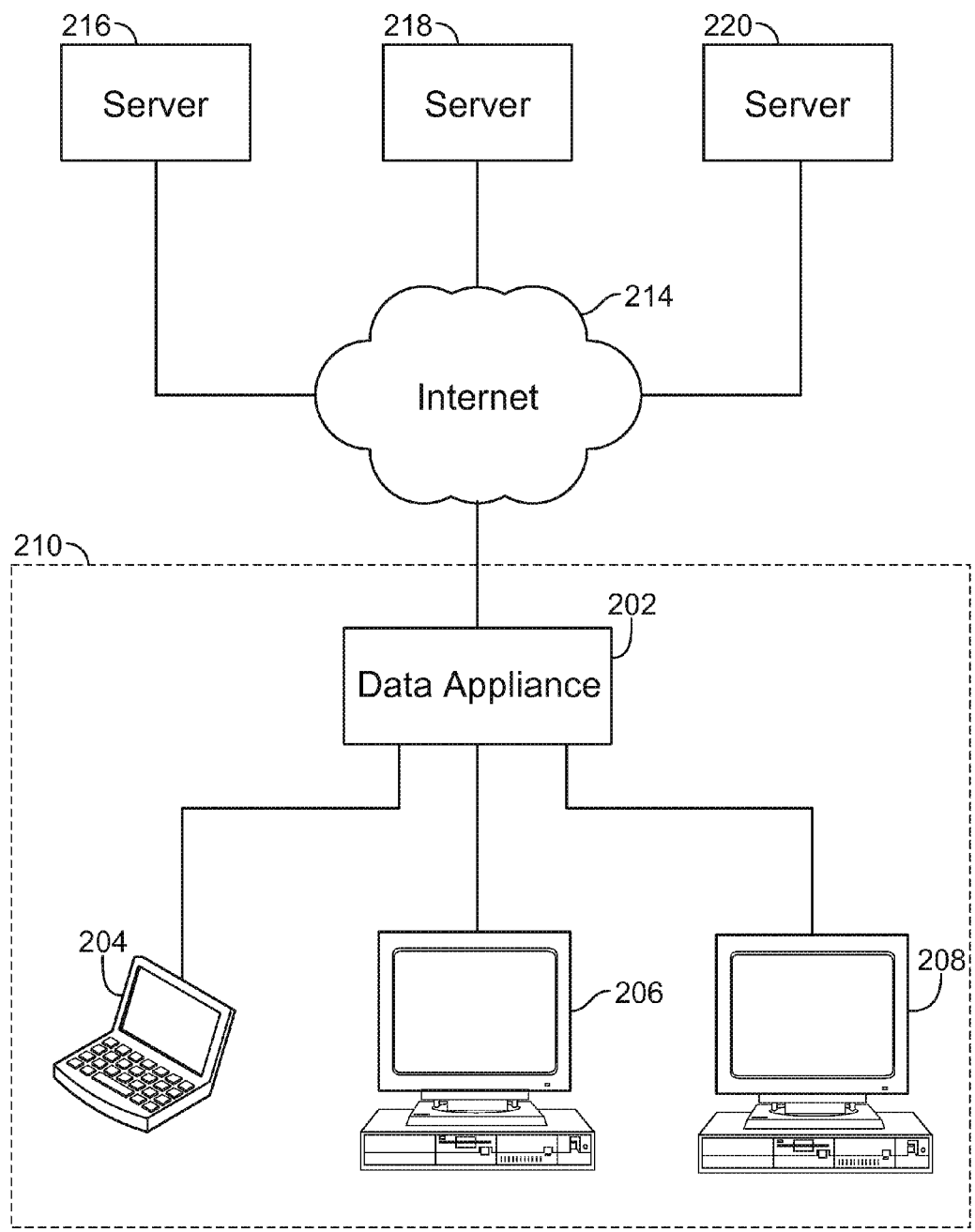
FIG. 2 is a block diagram of a network for detecting encrypted tunneling traffic in accordance with some embodiments.

FIG. 2 is a block diagram of a network for detecting encrypted tunneling traffic in accordance with some embodiments. As shown, a data appliance 202 (e.g., a data appliance that includes security functions, such as a security appliance that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
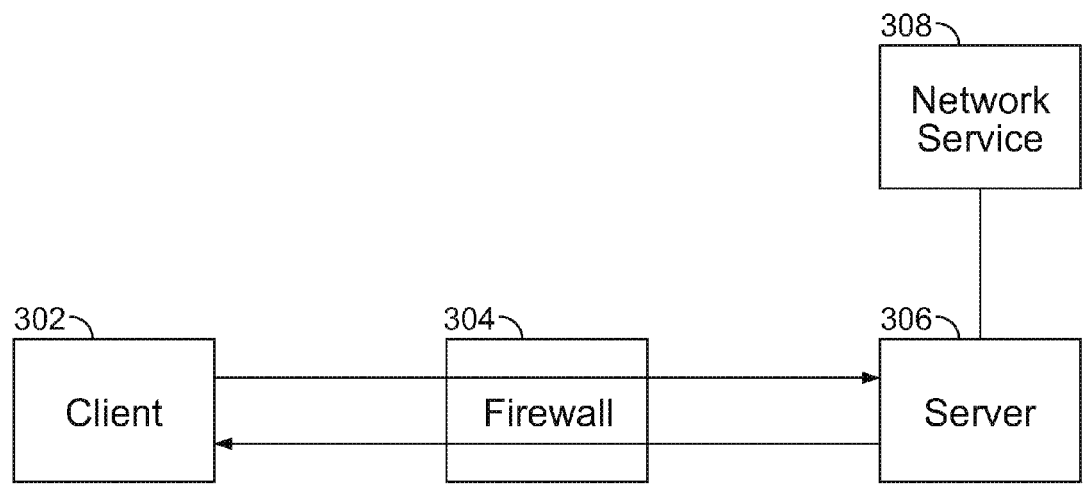
FIG. 3A is a functional block diagram illustrating a typical SSH session passing through a firewall.

FIG. 3A is a functional block diagram illustrating a typical SSH session passing through a firewall. In that session, firewall can only inspect the handshake traffic, as all the application data is encrypted. As shown, a client 302 establishes a secure tunnel session (e.g., creates an SSH tunnel) with a remote server 306. The client 302 can use the secure tunnel with the server 306 to access a network service 308, which can be a network service activity that is in violation of one or more firewall policies/rules implemented by the firewall device 304. However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
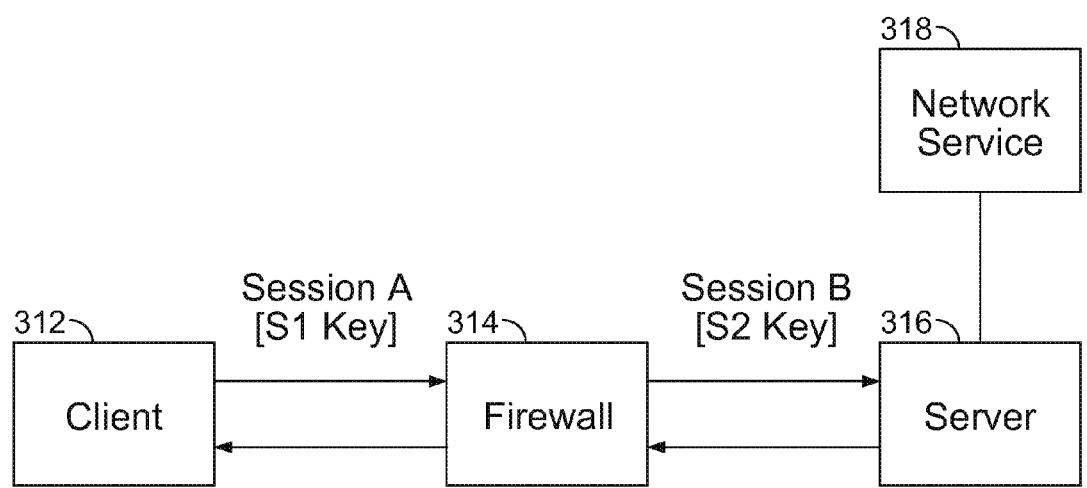
FIG. 3B functional block diagram illustrating detecting encrypted tunneling traffic in accordance with some embodiments.

FIG. 3B functional block diagram illustrating detecting encrypted tunneling traffic in accordance with some embodiments. As shown, a client 312 attempts to establish an SSH session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSH session request is intercepted and detected by the firewall 314. In response, the firewall 314 performs a trusted man-in-the-middle technique by effectively splitting the SSH session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key S1 and is then inspected by the firewall 314. If the client 312 requests a new channel to perform tunneling (e.g., create SSH tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSH-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSH remote-access traffic, the firewall 314 encrypts the tunneled traffic using a session key S2 and forwards the encrypted traffic to the remote server 316. Similarly traffic coming from the server is decrypted with the session key S2, inspected by the firewall 314, and then encrypted using the session key S1 and forwarded to the client 312.

Thus, using these techniques the firewall 314 is between the client 312 and the server 316 and can present itself as server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skill in the art in view of the various techniques and embodiments described herein, while the embodiments described above are described with reference to the SSH protocol, the various techniques described herein for detecting encrypted tunneling traffic can similarly be applied to other encrypted protocols that support tunneling.

Figure 4:
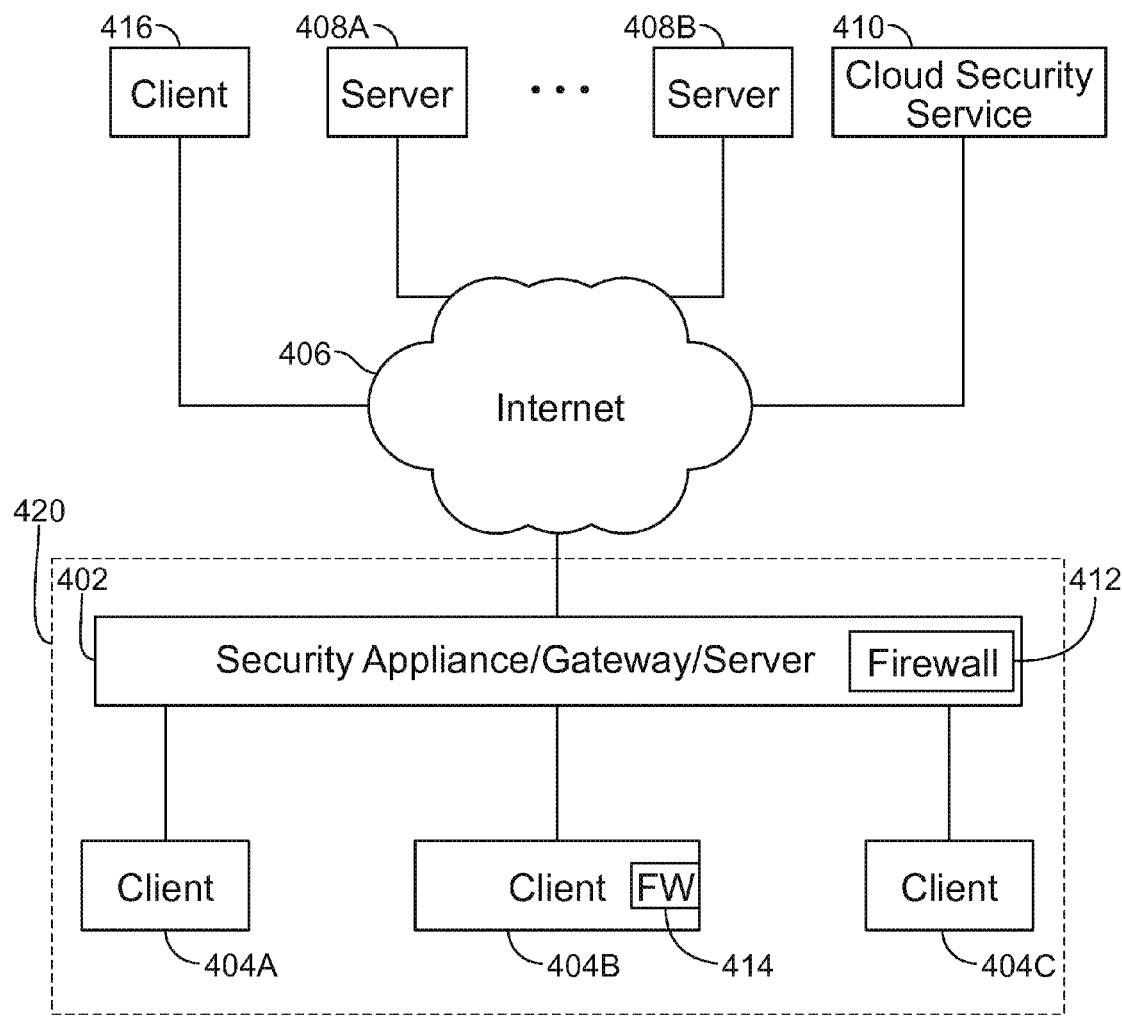
FIG. 4 is a block diagram illustrating an architecture for detecting encrypted tunneling traffic in accordance with some embodiments.

FIG. 4 is a block diagram illustrating an architecture for detecting encrypted tunneling traffic in accordance with some embodiments. As shown in FIG. 4, client devices 404A, 404B, and 404C are in communication with the Internet 406 via a security device 402. In some embodiments, the security device 402 includes a firewall 412 as shown. In some embodiments, one or more of the client devices 404A-404C includes a firewall 414 (e.g., host based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web related service (e.g., web site, cloud based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of various remote servers detected as being used for SSH tunneling of traffic for unauthorized network activities can be reported to the security cloud service 410 by the security device 402.

Figure 5:
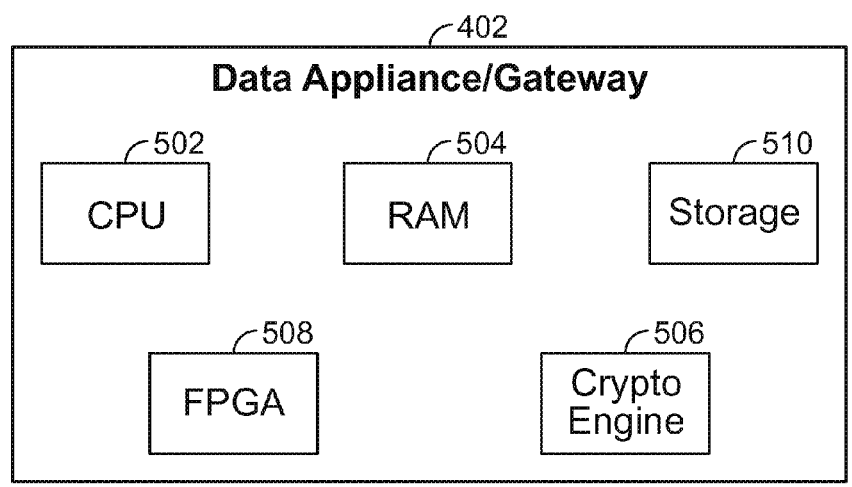
FIG. 5 is a functional diagram of hardware components of a data appliance for detecting encrypted tunneling traffic in accordance with some embodiments.

FIG. 5 is a functional diagram of hardware components of a data appliance for detecting encrypted tunneling traffic in accordance with some embodiments. The example shown is a representation of physical components that can be included in data appliance 402 (e.g., a data appliance or gateway). Specifically, data appliance 402 includes a high performance multi-core CPU 502 and RAM 504. Data appliance 402 also includes a storage 510 (e.g., one or more hard disks or solid state storage units), which is used to store policy and other configuration information as well as signatures. In some embodiments, storage 510 stores tables that include host names/identifiers and associated IP addresses and possibly other information for clients and/or remote servers identified as attempting SSH tunneling of traffic for unauthorized network activities. Data appliance 402 can also include one or more optional hardware accelerators. For example, data appliance 402 can include a cryptographic engine 506 configured to perform encryption and decryption operations, and one or more FPGAs 508 configured to perform signature matching, act as network processors, and/or perform other tasks.

Figure 6:
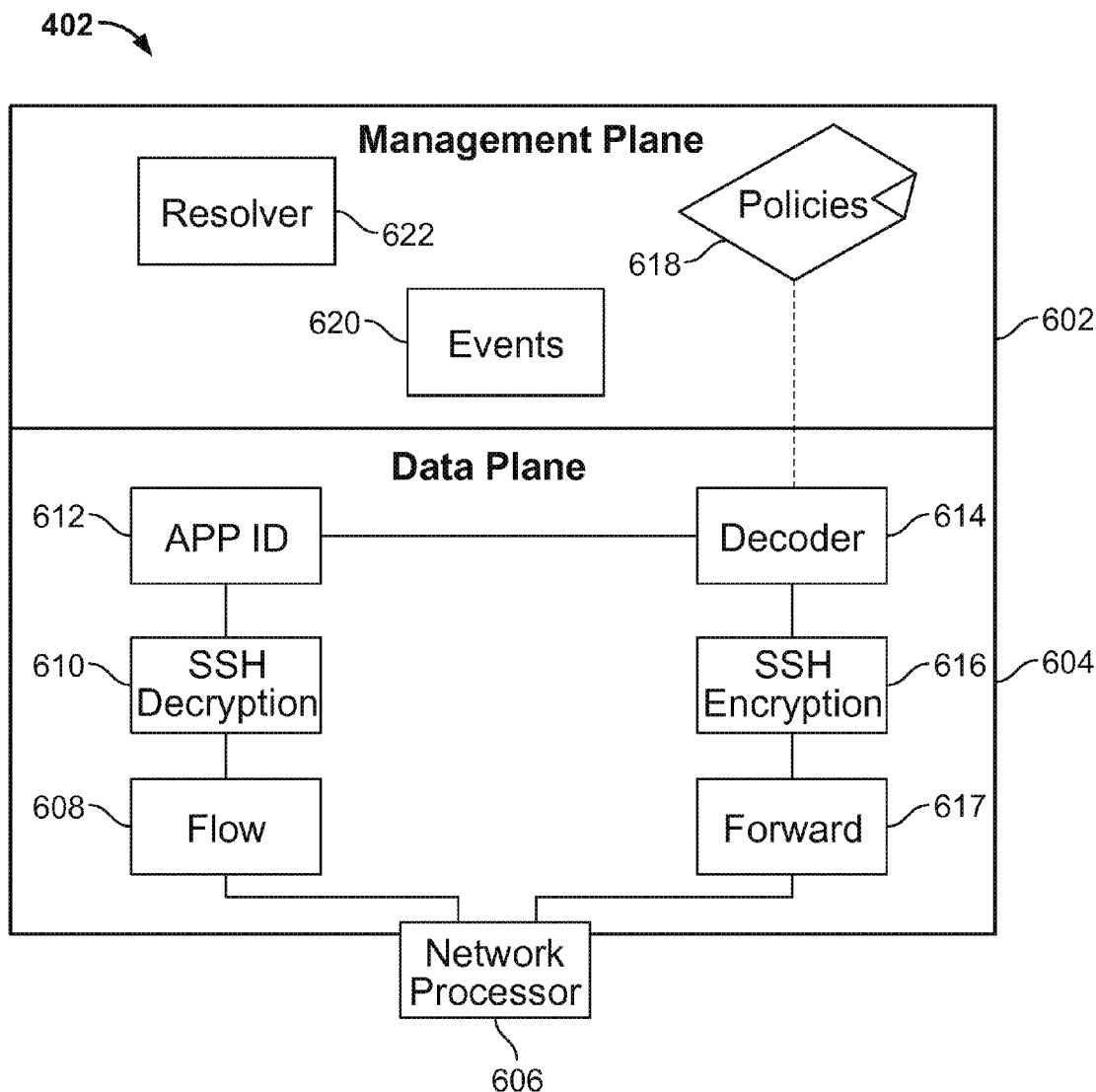
FIG. 6 is a functional diagram of logical components of a data appliance for detecting encrypted tunneling traffic in accordance with some embodiments.

FIG. 6 is a functional diagram of logical components of a data appliance for detecting encrypted tunneling traffic in accordance with some embodiments. The example shown is a representation of logical components that can be included in data appliance 402. As shown, data appliance 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSH. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSH decryption is applied by SSH decrypter 610 using various techniques as described herein. Otherwise, processing by SSH decrypter 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. As also shown, signatures 618 are received and stored in the management plane 602. In some embodiments, policy enforcement (e.g., policies can include one or more rules, which can be specified using domain and/or host/server names, and rules can apply one or more signatures or other matching criteria or heuristics) using signatures are applied as described herein with respect to various embodiments based on the monitored, identified, and decoded session traffic flows.

Figure 7:
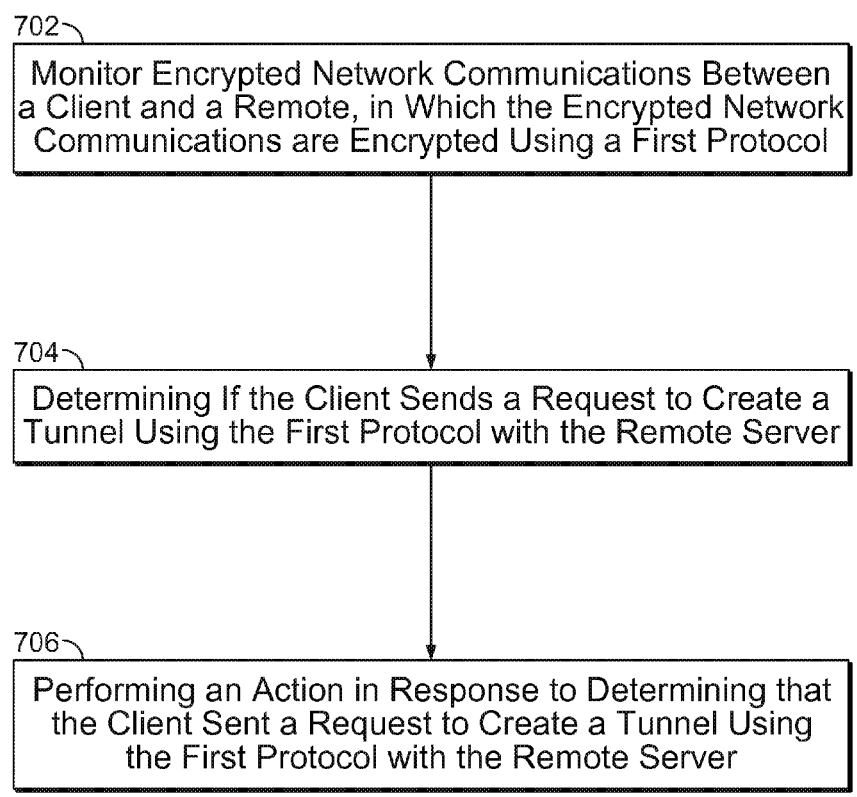
FIG. 7 is a flow diagram for detecting encrypted tunneling traffic in accordance with some embodiments.

FIG. 7 is a flow diagram for detecting encrypted tunneling traffic in accordance with some embodiments. At 702, monitoring encrypted network communications between a client and a remote server is performed, in which the encrypted network communications are encrypted using a first protocol. At 704, determining if the client sends a request to create a tunnel using the first protocol with the remote server is performed. At 706, performing an action (e.g., block, allow, allow and monitor, alert, and/or another action or combination of actions) is performed in response to determining that the client sent a request to create a tunnel using the first protocol with the remote server.

Figure 8:
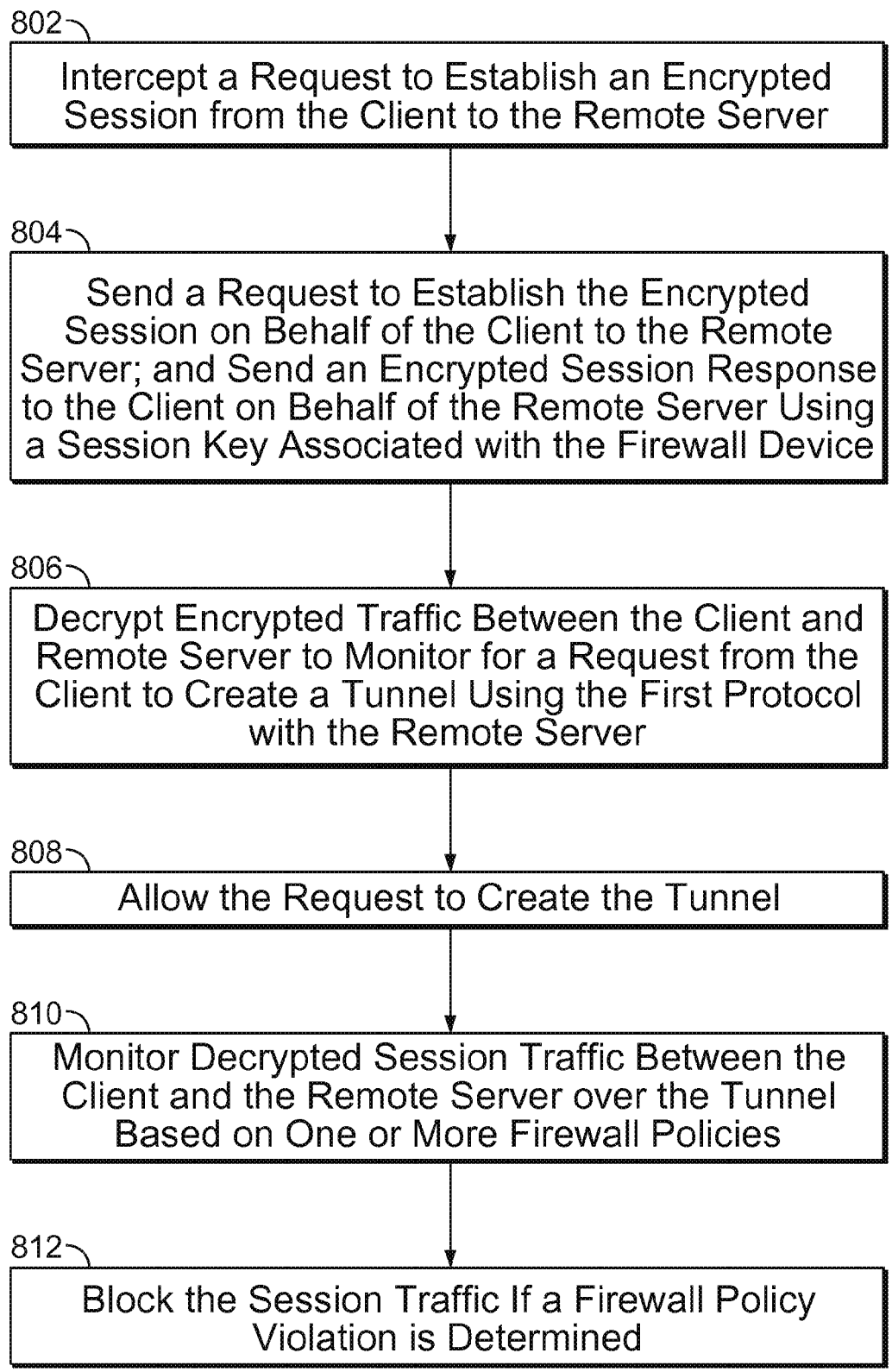
FIG. 8 is another flow diagram for detecting encrypted tunneling traffic in accordance with some embodiments.

FIG. 8 is another flow diagram for detecting encrypted tunneling traffic in accordance with some embodiments. At 802, intercepting a request to establish an encrypted session from the client to the remote server is performed. At 804, sending a request to establish the encrypted session on behalf of the client to the remote server is performed, and sending an encrypted session response to the client on behalf of the remote server using a session key associated with the firewall device is performed. At 806, decrypting encrypted traffic between the client and remote server to monitor for a request from the client to create a tunnel using the first protocol with the remote server is performed. At 808, allowing the request to create the tunnel is performed. At 810, monitoring decrypted session traffic between the client and the remote server over the tunnel based on one or more firewall policies is performed. At 812, blocking the session traffic is performed if a violation of a first firewall policy is determined.

In some embodiments, detecting encrypted tunneling traffic includes identifying suspicious clients based on the techniques described herein (e.g., determining that a client is tunneling using encrypted traffic to evade detection of one or more firewall policies/rules). In some embodiments, detecting encrypted tunneling traffic further includes identifying suspicious clients and determining reputation levels or reputation values for such clients.

In some embodiments, detecting encrypted tunneling traffic includes identifying suspicious servers (e.g., determining that a client is tunneling using encrypted traffic with a server to evade detection of one or more firewall policies/rules). In some embodiments, detecting encrypted tunneling traffic further includes reporting suspicious servers (e.g., based on IP address and/or using other identifying information), such as to a security cloud service.

In some embodiments, detecting encrypted tunneling traffic includes identifying suspicious clients/servers based on the techniques described herein (e.g., determining that a client is tunneling using encrypted traffic to evade detection of one or more firewall policies/rules and/or determining that a client is tunneling using encrypted traffic to evade detection of one or more firewall policies/rules). In some embodiments, detecting encrypted tunneling traffic further includes quarantining and/or alerting based on such suspicious servers/clients.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A network device for monitoring network communications, comprising:
   a processor; and
   a memory coupled with the processor, wherein the memory is configured to provide the processor with instructions which when executed cause the processor to:
   monitor encrypted network communications between a client and a remote server;
   decrypt encrypted session traffic between the client and remote server;
   monitor, within the decrypted encrypted session traffic, for a request from the client to create a tunnel using a first protocol with the remote server by applying a trusted man-in-the-middle technique using a self-signed certificate to inspect monitored traffic between the client and the remote server to facilitate deep packet inspection of the encrypted session traffic between the client and remote server, comprising to:
  determine, within the decrypted encrypted session traffic, if the client sends the request to create the tunnel using the first protocol with the remote server; and
  in response to a determination that the client sent the request to create the tunnel using the first protocol with the remote server:
    intercept the request to establish the tunnel using the first protocol with the remote server, wherein the request is found within the decrypted encrypted session traffic;
    block, after the intercepting of the request, the request to create the tunnel; and
    send a response to the client, the response informing the client that tunneling using the first protocol is not supported by the remote server;
  perform a traffic analysis of the decrypted encrypted session traffic between the client and remote server, comprising to:
    identify an application generating the monitored traffic, comprising to determine what type of traffic a session involves, the type of traffic the session involves includes Hypertext Transfer Protocol (HTTP) traffic, File Transfer Protocol (FTP) traffic, Secure Sockets Layer (SSL) traffic, Secure Shell (SSH) traffic, a Domain Name System (DNS) request, unclassified application traffic, or any combination thereof;
    identify a user generating the monitored traffic, comprising to determine a source IP of the monitored traffic; and
    identify content relating to the monitored traffic, comprising to determine peer-to-peer activities, social networking activities, web browsing on certain prohibited web sites, streaming music, streaming video, use of unauthorized protocols, use of unauthorized applications, or any combination thereof;
  determine whether a firewall policy is violated based on the traffic analysis of the encrypted session traffic between the client and remote server; and
  send a message to a cloud security service if the deep packet inspection determined that the client is using the encrypted tunnel to evade a firewall policy, wherein the message includes identifying information associated with the remote server.

2. The network device recited in claim 1, wherein the first protocol is a Secure Sockets Layer (SSL) protocol.

3. The network device recited in claim 1, wherein the first protocol is a Secure Shell (SSH) protocol.

4. The network device recited in claim 1, wherein the network device includes a data appliance.

5. The network device recited in claim 1, wherein the network device includes a security appliance.

6. The network device recited in claim 1, wherein the network device includes a gateway.

7. The network device recited in claim 1, wherein the network device includes a security gateway.

8. The network device recited in claim 1, wherein the processor is further configured to: determine a protocol of the monitored network communications, wherein the identifying of the application is capable of identifying two or more of the following protocols:
  HyperText Transfer Protocol (HTTP), File Transfer Protocol (FTP), Secure Sockets Layer (SSL), Secure Shell (SSH), Domain Name System (DNS) requests, and an unknown protocol.

9. The network device recited in claim 1, wherein the processor is further configured to: determine whether a firewall policy is violated based on the traffic analysis of the encrypted session traffic between the client and remote server.

10. The network device recited in claim 1, wherein the processor is further configured to: report the remote server as suspicious to a security cloud service if the traffic analysis of the encrypted session traffic between the client and remote server violates a firewall policy.

11. The network device recited in claim 1, wherein the processor is further configured to: block the encrypted session traffic between the client and remote server if a firewall policy violation is determined.

12. The network device recited in claim 1, wherein the processor is further configured to: block the encrypted session traffic between the client and remote server if the deep packet inspection determined that the client is using the encrypted tunnel to evade a firewall policy.

13. The network device recited in claim 1, wherein the firewall policy includes one or more rules associated with peer-to-peer activities, social networking activities, web browsing on one or more prohibited web sites, streaming music, streaming video, one or more unauthorized protocols, and/or one or more unauthorized applications.

14. The network device recited in claim 1,
  wherein the processor is further configured to: identify content associated with the monitored network communications, wherein the network device blocks unauthorized downloading of content from the remote server to the client using the first protocol based on a firewall policy.

15. A method of a network device for monitoring network communications, comprising:
  monitoring encrypted network communications between a client and a remote server;
  decrypting encrypted session traffic between the client and remote server;
  monitoring, within the decrypted encrypted session traffic, for a request from the client to create a tunnel using a first protocol with the remote server by applying a trusted man-in-the-middle technique using a self-signed certificate to inspect monitored traffic between the client and the remote server to facilitate deep packet inspection of the encrypted session traffic between the client and remote server, comprising:
    determining, within the decrypted encrypted session traffic, if the client sends the request to create the tunnel using the first protocol with the remote server; and
    in response to a determination that the client sent the request to create the tunnel using the first protocol with the remote server:
      intercepting the request to establish the tunnel using the first protocol with the remote server, wherein the request is found within the decrypted encrypted session traffic;
      blocking, after the intercepting of the request, the request to create the tunnel; and sending a response to the client, the response informing the client that tunneling using the first protocol is not supported by the remote server;

performing a traffic analysis of the decrypted encrypted session traffic between the client and remote server, comprising:

identifying an application generating the monitored traffic, comprising determining what type of traffic a session involves, the type of traffic the session involves includes Hypertext Transfer Protocol (HTTP) traffic, File Transfer Protocol (FTP) traffic, Secure Sockets Layer (SSL) traffic, Secure Shell (SSH) traffic, a Domain Name System (DNS) request, unclassified application traffic, or any combination thereof;

identifying a user generating the monitored traffic, comprising determining a source IP of the monitored traffic; and identifying content relating to the monitored traffic, comprising determining peer-to-peer activities, social networking activities, web browsing on certain prohibited web sites, streaming music, streaming video, use of unauthorized protocols, use of unauthorized applications, or any combination thereof;

determining whether a firewall policy is violated based on the traffic analysis of the encrypted session traffic between the client and remote server; and sending a message to a cloud security service if the deep packet inspection determined that the client is using the encrypted tunnel to evade a firewall policy, wherein the message includes identifying information associated with the remote server.

16. A computer program product for a network device for monitoring network communications, the computer program product being embodied in a tangible non-transitory computer readable storage medium and comprising computer instructions for:

monitoring encrypted network communications between a client and a remote server;

decrypting encrypted session traffic between the client and remote server;

monitoring, within the decrypted encrypted session traffic, for a request from the client to create a tunnel using a first protocol with the remote server by applying a trusted man-in-the-middle technique using a self-signed certificate to inspect monitored traffic between the client and the remote server to facilitate deep packet inspection of the encrypted session traffic between the client and remote server, comprising:

determining, within the decrypted encrypted session traffic, if the client sends the request to create the tunnel using the first protocol with the remote server; and in response to a determination that the client sent the request to create the tunnel using the first protocol with the remote server:

intercepting the request to establish the tunnel using the first protocol with the remote server, wherein the request is found within the decrypted encrypted session traffic;

blocking, after the intercepting of the request, the request to create the tunnel; and sending a response to the client, the response informing the client that tunneling using the first protocol is not supported by the remote server;

performing a traffic analysis of the decrypted encrypted session traffic between the client and remote server, comprising:

identifying an application generating the monitored traffic, comprising determining what type of traffic a session involves, the type of traffic the session involves includes Hypertext Transfer Protocol (HTTP) traffic, File Transfer Protocol (FTP) traffic, Secure Sockets Layer (SSL) traffic, Secure Shell (SSH) traffic, a Domain Name System (DNS) request, unclassified application traffic, or any combination thereof;

identifying a user generating the monitored traffic, comprising determining a source IP of the monitored traffic; and identifying content relating to the monitored traffic, comprising determining peer-to-peer activities, social networking activities, web browsing on certain prohibited web sites, streaming music, streaming video, use of unauthorized protocols, use of unauthorized applications, or any combination thereof;

determining whether a firewall policy is violated based on the traffic analysis of the decrypted encrypted session traffic between the client and remote server; and sending a message to a cloud security service if the deep packet inspection determined that the client is using the encrypted tunnel to evade a firewall policy, wherein the message includes identifying information associated with the remote server.

\* \* \* \* \*